United States Patent
Kim

(10) Patent No.: US 7,800,899 B2
(45) Date of Patent: Sep. 21, 2010

(54) INFORMATION PROCESSING APPARATUS

(75) Inventor: Yong-duck Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/165,855

(22) Filed: Jul. 1, 2008

(65) Prior Publication Data

US 2009/0059517 A1 Mar. 5, 2009

(30) Foreign Application Priority Data

Aug. 28, 2007 (KR) .............. 10-2007-0086584

(51) Int. Cl.
*H05K 7/20* (2006.01)
(52) U.S. Cl. .......... 361/679.47; 361/688; 361/694; 361/695; 174/16.1
(58) Field of Classification Search .......... None
See application file for complete search history.

(56) References Cited

U.S. PATENT DOCUMENTS

| | | | | |
|---|---|---|---|---|
| 6,266,243 B1 * | 7/2001 | Tomioka | .............. | 361/695 |
| 6,353,536 B1 * | 3/2002 | Nakamura et al. | ..... | 361/679.41 |
| 6,804,115 B2 * | 10/2004 | Lai | .................. | 361/695 |
| 6,822,856 B2 * | 11/2004 | Fujiwara | ............. | 361/679.48 |
| 7,019,968 B2 * | 3/2006 | Kitahara | .............. | 361/695 |
| 7,336,489 B1 * | 2/2008 | Chen et al. | ........... | 361/700 |
| 7,352,581 B2 * | 4/2008 | Tomioka | .............. | 361/702 |
| 7,388,745 B2 * | 6/2008 | DeLuga et al. | ......... | 361/690 |
| 7,539,009 B2 * | 5/2009 | Hata et al. | ............ | 361/679.47 |
| 2005/0213302 A1 * | 9/2005 | Lin | .................... | 361/695 |
| 2006/0082966 A1 * | 4/2006 | Lev et al. | ............. | 361/687 |

* cited by examiner

*Primary Examiner*—Boris L Chervinsky
(74) *Attorney, Agent, or Firm*—Stanzione & Kim, LLP

(57) ABSTRACT

An information processing apparatus includes a casing having a first accommodating unit, and a second accommodating unit which protrudes from at least one area of the first accommodating unit; a main body which includes at least one heat generating component which is accommodated in the first accommodating unit, and a port unit which is formed at an outer side of the first accommodating unit; and a heat radiating unit which is accommodated in the second accommodating unit, and discharges heat of the heat generating component to an outside of the casing.

17 Claims, 8 Drawing Sheets

INFORMATION PROCESSING APPARATUS

CROSS-REFERENCE TO RELATED APPLICATIONS

This application claims priority from Korean Patent Application No. 10-2007-0086584, filed on Aug. 28, 2007 in the Korean Intellectual Property Office, the disclosure of which is incorporated herein by reference in its entirety.

BACKGROUND OF THE INVENTION

1. Field of the Invention

The present general inventive concept relates to an information processing apparatus, and more particularly, to an information processing apparatus including a fan to cool a heat generating component.

2. Description of the Related Art

An information processing apparatus receives various information, and processes the information. The information processing apparatus, such as a notebook, is portable because it is of a small size and light weight, and processes data without restriction of placement thereof. Since, like a desktop computer, the information processing apparatus such as the notebook includes a heat generating component, such as a central processing unit (CPU), a GFX which is a graphic controller, etc., to receive power to process information, heat is generated during use. Accordingly, a cooling fan radiating the heat generated inside the information processing apparatus to the outside is necessary.

FIG. 1 illustrates a cooling fan configuration of a conventional information processing apparatus 1. As illustrated in FIG. 1, in the conventional information processing apparatus 1, since a cooling fan 3 is positioned at a side surface or a rear surface of a main body 2, a port necessary for connection with an external device can not be disposed at the space in which the cooling fan 3 is positioned, and noises of the cooling fan 3 are directly transmitted to the outside.

Also, a recent information processing apparatus has widely employed a ball grid array (BGA) design disposing a heat generating component at a central area of the main body 2 to reduce deterioration of a printed circuit board (PCB). Here, since the distance between the heat generating component and the cooling fan 3 is substantial, a cooling efficiency decreases.

SUMMARY OF THE INVENTION

The present general inventive concept provides an information processing apparatus to reduce a distance between a cooling fan and a heat generating component, thereby increasing a cooling efficiency.

The present general inventive concept also provides an information processing apparatus to dispose a cooling fan at a bottom surface of a printed circuit board to obtain a space for the printed circuit board, thereby improving portability and enabling miniaturization of the apparatus.

The present general inventive concept also provides an information processing apparatus to enable a port connected with an external device to be freely disposed.

The present general inventive concept also provides an information processing apparatus that reduces noises of a cooling fan.

Additional aspects of the present general inventive concept will be set forth in part in the description which follows and, in part, will be obvious from the description, or may be learned by practice of the present general inventive concept.

The foregoing and/or other aspects and utilities of the present general inventive concept can be achieved by providing an information processing apparatus, comprising: a casing which comprises a first accommodating unit, and a second accommodating unit which protrudes from at least one area of the first accommodating unit; a main body which comprises at least one heat generating component which is accommodated in the first accommodating unit, and a port unit which is formed at an outer side of the first accommodating unit; and a heat radiating unit which is accommodated in the second accommodating unit, and discharges heat of the heat generating component to an outside of the casing.

The heat radiating unit may comprise a cooling fan, and the second accommodating unit may comprise a discharging hole which is formed to extend inwardly from an end side of the main body so that heat led by the cooling fan can be discharged to the outside.

The second accommodating unit may comprise an inhaling hole which is distanced from the discharging hole, and enables external air to flow in an inside of the second accommodating unit.

The heat generating component may be mounted to a printed circuit board which is accommodated in the first accommodating unit, and the information processing apparatus may comprise a heat transmitting unit which leads the heat which is generated from the mounted heat generating component to the heat radiating unit.

The heat generating component may be mounted at a lower surface of the printed circuit board.

The heat generating component may be mounted at an upper surface of the printed circuit board, and the heat transmitting unit may comprise a through hole which is formed through the printed circuit board so that the heat which is generated from the heat generating component can be transmitted.

The heat transmitting unit may comprise a heat pipe which extends from the heat generating component to the heat radiating unit.

The heat radiating unit may further comprise a supporting member which supports the heat radiating unit against the printed circuit board so that the heat radiating unit can be distanced from a surface of the printed circuit board.

The heat generating component may be positioned to a central portion of the printed circuit board.

The foregoing and/or other aspects and utilities of the present general inventive concept can be achieved by providing an information processing apparatus, comprising: a main body including a first accommodating unit having at least one heat generating component accommodated therein and a port unit formed at an outer side thereof, and a second accommodating unit extending downward from and having a smaller area than the first accommodating unit, the second accommodating unit including a heat radiating unit which is accommodated therein and discharges heat of the heat generating component to an outside of the main body.

The second accommodating unit can be formed to be inwardly stepped with respect to the first accommodating unit.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
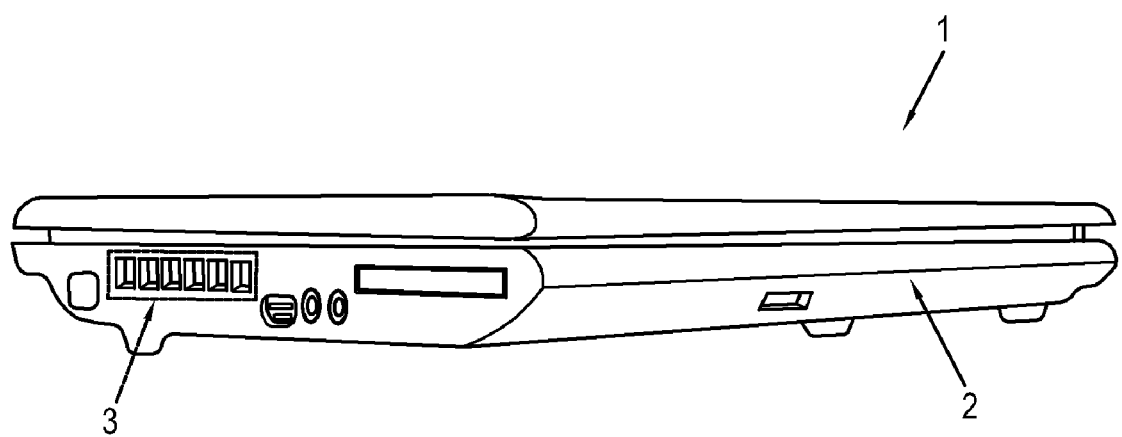
FIG. 1 illustrates a configuration of a conventional information processing apparatus.

Reference will now be made in detail to the embodiments of the present general inventive concept, examples of which are illustrated in the accompanying drawings, wherein like reference numerals refer to like elements throughout. The exemplary embodiments are described below so as to explain the embodiments of the present general inventive concept by referring to the figures.

Figure 2A:
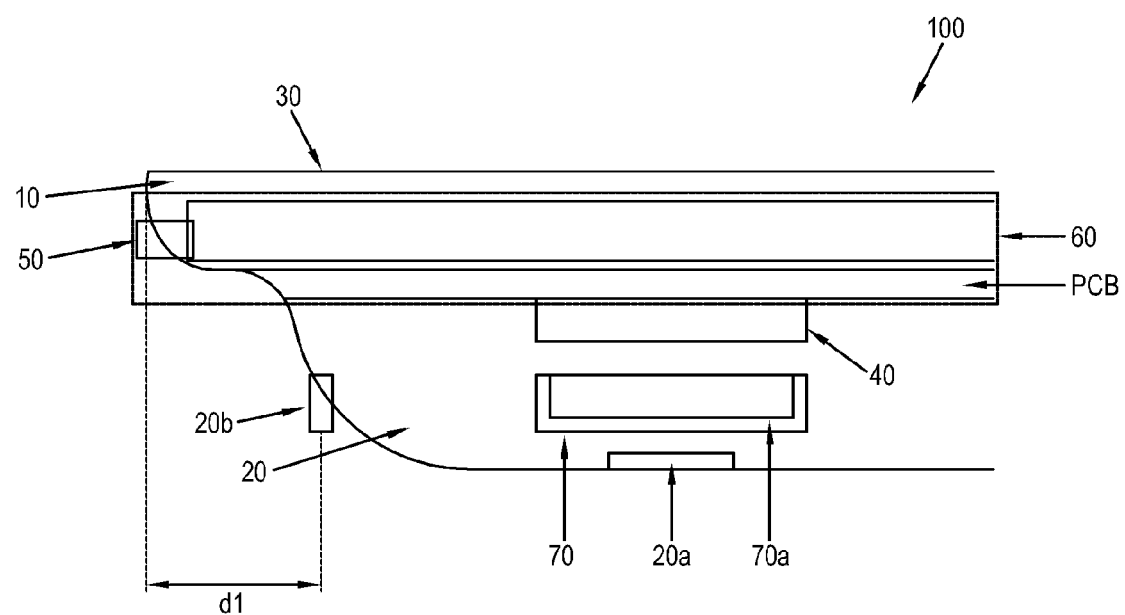
FIGS. 2A to 2C illustrate a configuration of an information processing apparatus according to an exemplary embodiment of the present general inventive concept.

FIG. 2A is a side sectional view illustrating a configuration of an information processing apparatus 100 according to an exemplary embodiment of the present general inventive concept. As illustrated in FIG. 2A, the information processing apparatus 100 according to this exemplary embodiment includes a casing 30 having a first accommodating unit 10, and a second accommodating unit 20 protruding from at least one area of a bottom surface of the first accommodating unit 10; a main body 60 having at least one heat generating component 40 accommodated in the first accommodating unit 10, and a port unit 50 formed at an outer side of the first accommodating unit 10; and a heat radiating unit 70 accommodated in the second accommodating unit 20 and to discharge heat of the heat generating component 40 to an outside of the casing 30.

The first accommodating unit 10 accommodates the heat generating component 40, and the port unit 50 is formed at the outer side thereof. The heat generating component 40 includes a central processing unit (CPU), and various chip sets, such as a GFX, which is a graphic controller, etc. Also, the port unit 50 formed at the outer side of the first accommodating unit 10 may be disposed at an upper surface of a printed circuit board, or a lower surface thereof, and may be provided in plural according to various standards being capable of being connected with an external device, for example, a universal serial bus (USB), etc.

The second accommodating unit 20 protrudes from at least one area of the bottom surface of the first accommodating unit 10, and accommodates the heat radiating unit 70 to discharge the heat of the heat generating component 40 to the outside of the casing 30.

Figure 2B:
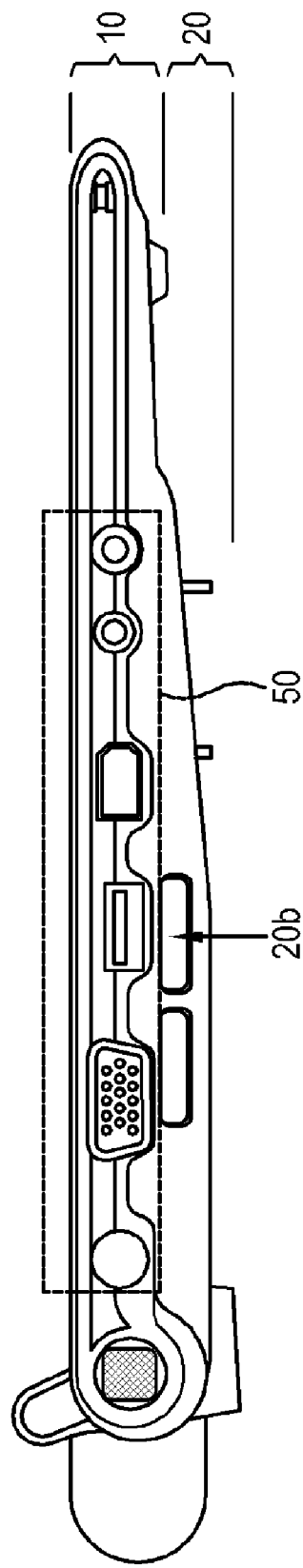

The second accommodating unit 20 according to an exemplary embodiment of the present general inventive concept is disposed at a lower surface of the first accommodating unit 10 so that the information processing apparatus 100 according to the exemplary embodiment can have a two stair configuration. In other words, as illustrated in FIG. 2B, an outer edge of the second accommodation unit 20 is inwardly offset from an outer edge of the first accommodation unit 10 by a distance d1. When the discharge hole 20b is located on the outer edge of the second accommodation unit 20, the discharge hole 20b is likewise offset from the outer edge of the first accommodation unit 10 by the distance d1. FIG. 2B is a side view illustrating a side of the information processing apparatus 100 according to the present exemplary embodiment, and FIG. 2C is a front view illustrating a front of the information processing apparatus 100 according to the present exemplary embodiment.

Figure 2C:
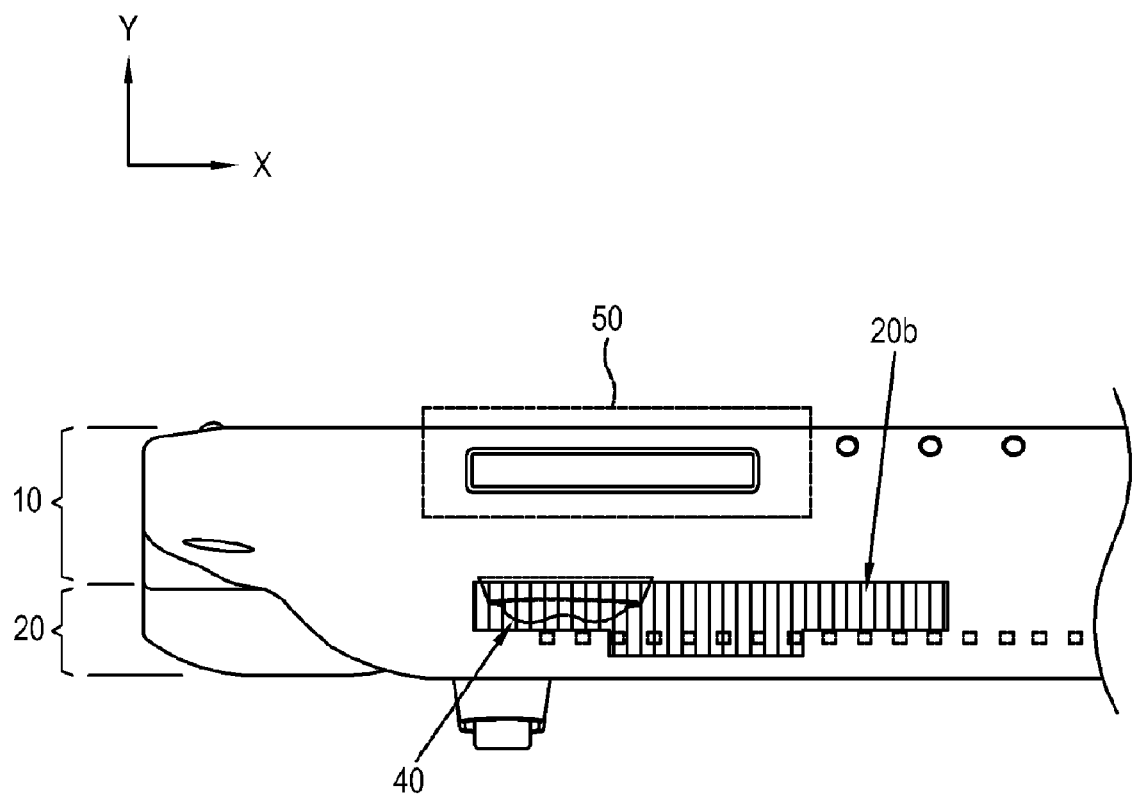

As illustrated in FIGS. 2B and 2C, since the port unit 50 is capable of being disposed anywhere at the first accommodating unit 10 irrespective of the position of the heat radiating unit 70 accommodated in the second accommodating unit 20 as a result of the two stair configuration with respect to the first and second accommodating units 10 and 20, the information processing apparatus 100 according to the present exemplary embodiment can improve integration thereof. As illustrated in FIG. 2C, the second accommodating unit 20 may protrude from the first accommodating unit 10 downwardly in the direction y, and may be offset inwardly from an outer edge of the first accommodating unit 10 in the direction x.

Figure 3A:
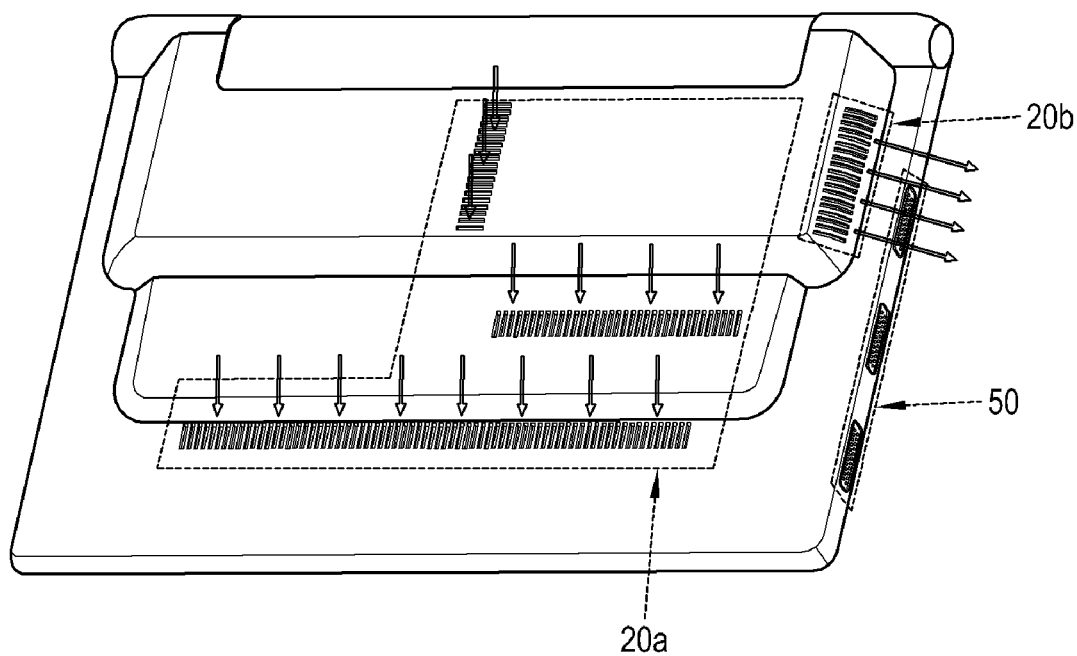
FIGS. 3A to 3D are sectional views illustrating the configuration of the information processing apparatus according to the exemplary embodiment of the present general inventive concept.

Also, the second accommodating unit 20 according to the present exemplary embodiment may include an inhaling hole, intake, or intake hole 20a formed to be distanced from a discharging hole 20b and enabling an external air to flow in an inside of the second accommodating unit 20. FIG. 3A is a bottom view illustrating the configuration of the information processing apparatus 100 according to the present exemplary embodiment. As illustrated in FIG. 3A, the inhaling hole 20a according to the present exemplary embodiment may be provided on any side or on all sides of the second accommodating unit 20 and the main body 60 of the casing 30. Also, since a cooling fan 70a and the discharging hole 20b according to the present exemplary embodiment are not positioned at a side surface or a rear surface of the main body 60, the port unit 50 can be freely configured anywhere on the main body 60.

Figure 3B:
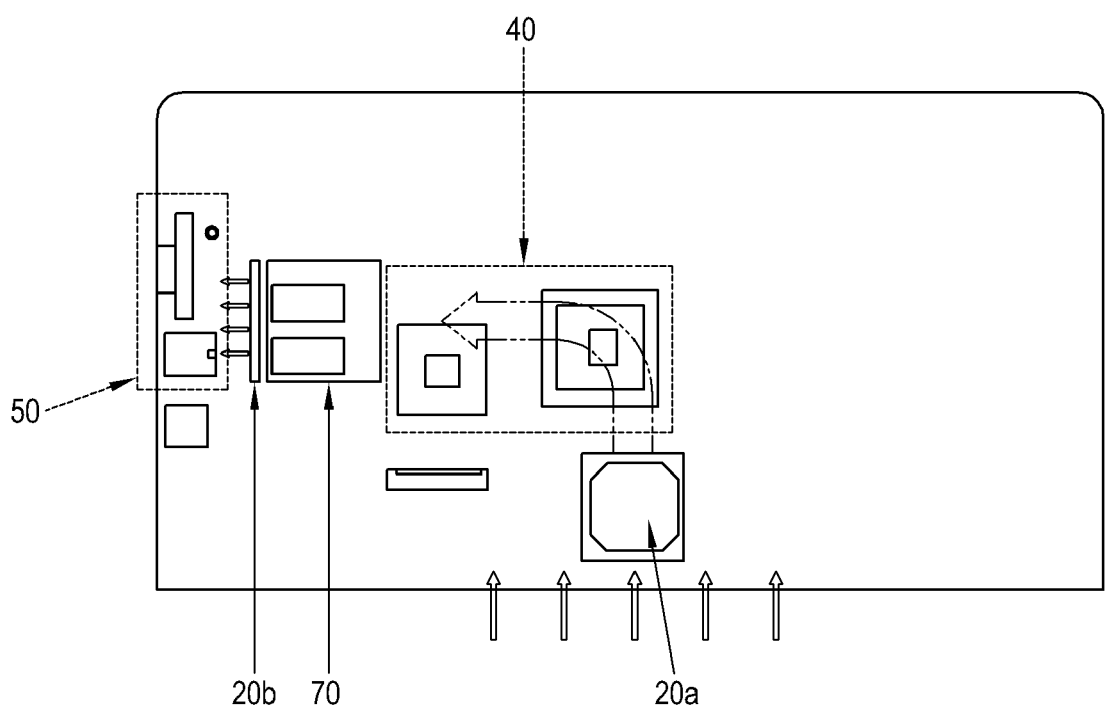

Here, although the cooling fan 70a according to the present exemplary embodiment is positioned at a lower surface of the printed circuit board, a supporting member (not shown) may be further provided to support the heat radiating unit 70 against the printed circuit board so that the heat radiating unit 70 can be distanced from a surface of the printed circuit board. Accordingly, a predetermined space can be provided at upper and lower positions of the cooling fan 70a so that circulation of air inhaled through the inhaling hole 20a and discharged through the discharging hole 20b can be smoothly accomplished. FIG. 3B illustrates a flow of air being inhaled through the inhaling hole 20a and being discharged through the discharging hole 20b. Since the discharging hole 20b is positioned at an inner side of the main body 60 in comparison to the port unit 50, the information processing apparatus 100 according to the present exemplary embodiment can reduce the distance between the inhaling hole 20a and the discharging hole 20b in comparison to the conventional information processing apparatus 1, thereby further improving a cooling efficiency of the heat generating component 40.

Figure 3C:
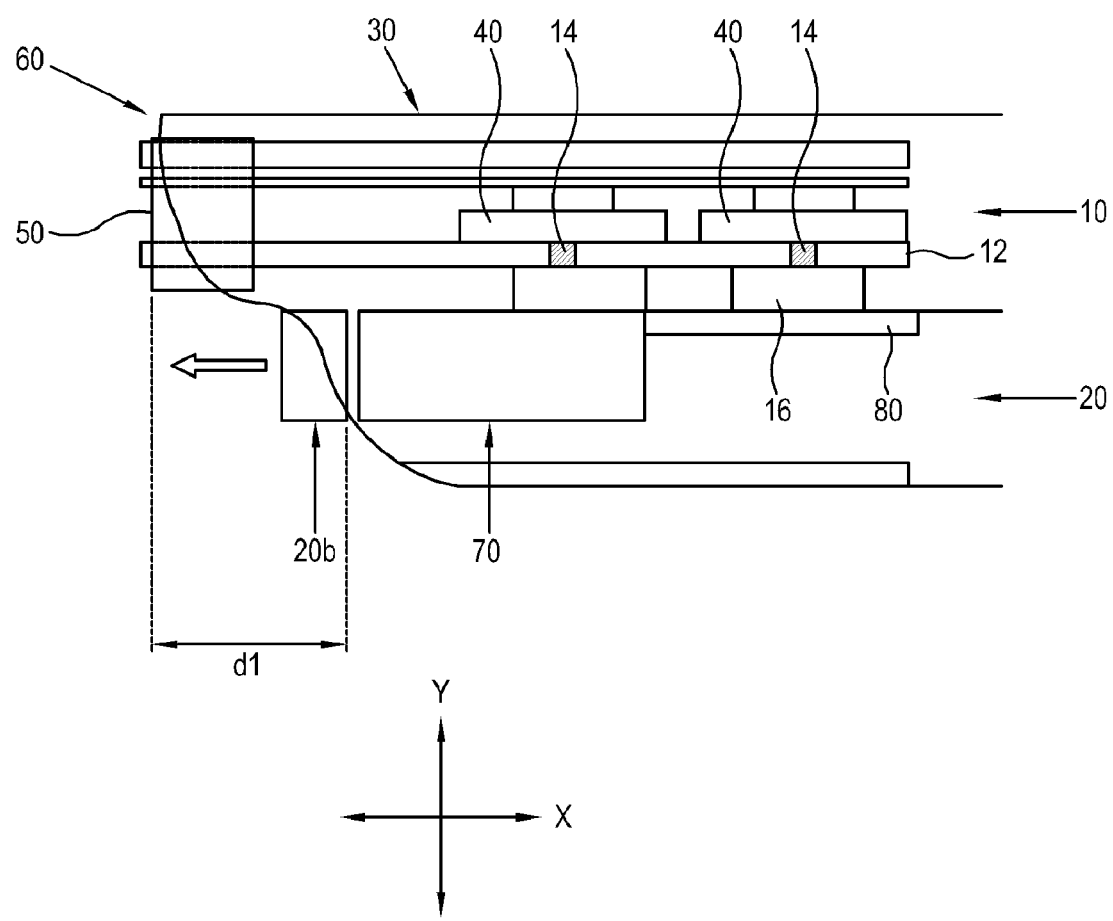

Also, as illustrated in FIG. 3C, the second accommodating unit 20 may protrude from the first accommodating unit 10 in a direction y while being inwardly offset from a side of the first accommodating unit 10 in a direction x by a distance d1, for example. Since the discharging hole 20b may not be seen from a user's perspective from a top surface of the main body 60, a user cannot directly feel the heat generated from the heat generating component 40. Also, in spite of the offset configuration in which the first and second accommodating units 10 and 20 are provided at different locations in the direction x, the thickness of the information processing apparatus 100 can be minimized. In addition, as shown in FIG. 3C, since the port unit 50 may be located on a side edge of the first accommodation unit 10 and the discharge hole 20b may be located on a side edge of the second accommodation unit 20, the discharge hole 20b may be offset from the port 50 by a distance in the x direction, such as distance d1, for example.

The heat radiating unit 70 is accommodated in the second accommodating unit 20, and discharges the heat of the heat generating component 40 to the outside of the casing 30. The heat radiating unit 70 according to the present exemplary embodiment includes the cooling fan 70a, and the second accommodating unit 20 is provided with the discharging hole 20b so that the heat led by the cooling fan 70a can be discharged to the outside. The first accommodating unit 10 may include a printed circuit board 12 and a heat generating unit 40 may be mounted on an upper surface of the printed circuit board 12. A through hole 14 may be formed in the printed circuit board 12 to transmit heat from the heat generating unit 40 to the heat radiating unit 70. A heat transmission unit 80 may transmit heat from the heat generating unit 40 to the heat radiating unit 70 via the through holes 14. Supports 16 may mount the heat radiating unit 70 to the printed circuit board 12 or may be used to space the heat radiating unit 70 from the printed circuit board 12.

Figure 3D:
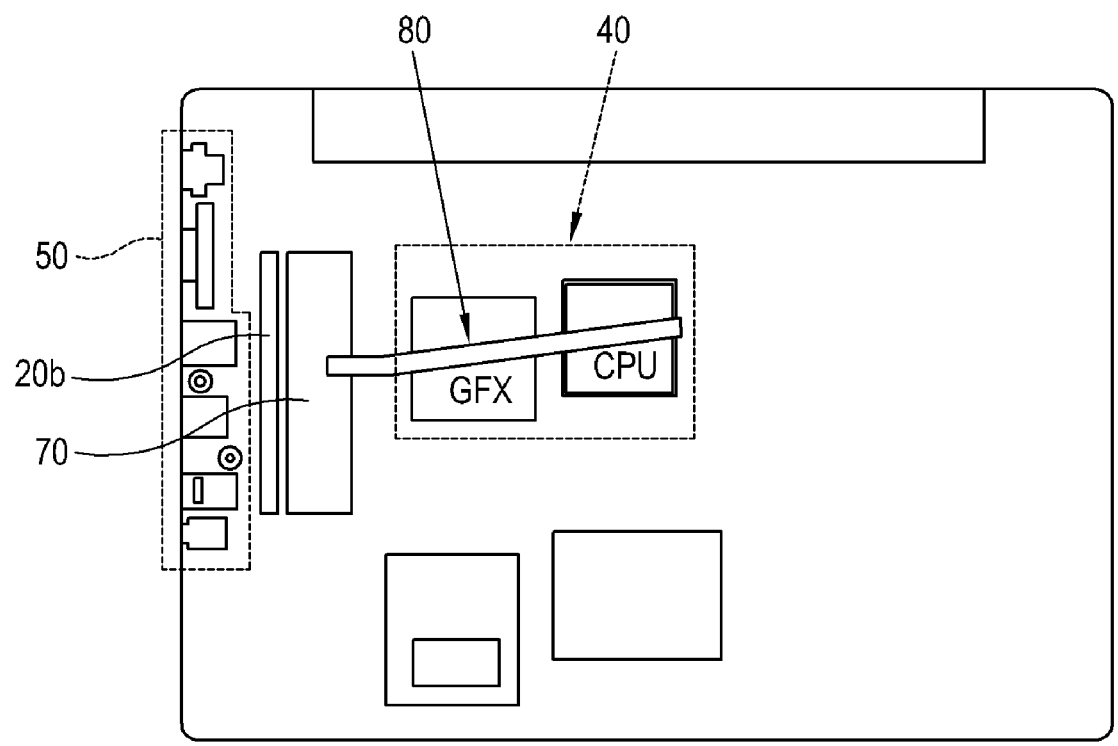

FIG. 3D is a plane sectional view illustrating the configuration of the information processing apparatus 100 according to the present exemplary embodiment. As illustrated in FIG. 3D, the heat generating component 40 includes the central processing unit (CPU), the GFX which is the graphic controller, etc., and may be disposed at a central portion of the main body 60. The cooling fan 70a is positioned at a central portion of the second accommodating unit 20 to efficiently discharge the heat generated from the heat generating component 40 to the outside through the discharging hole 20b. Accordingly, the information processing apparatus 100 according to the present exemplary embodiment can be easily applied to a recent information processing apparatus employing a ball grid array (BGA) design disposing the heat generating component 40 at the central portion of the main body 60, and a floating design to protect the information processing apparatus from an external impact, etc.

Also, the information processing apparatus 100 according to the present exemplary embodiment may further include a heat transmitting unit 80 leading the heat generated from the heat generating component 40 to the heat radiating unit 70. The heat transmitting unit 80 according to the present exemplary embodiment may be provided as a heat pipe. Since the distance between the heat generating component 40 and the cooling fan 70a is short, the cooling efficiency can be improved in comparison to the conventional information processing apparatus 1, and the cost of materials, etc., necessary to provide the heat pipe can be reduced.

Here, the heat generating component 40 according to the present exemplary embodiment is capable of being mounted to the printed circuit board, and is capable of being mounted to all upper and lower surfaces of the printed circuit board. It is preferable but not necessary that the heat generating component 40 is mounted to a surface of the printed circuit board facing the direction of the second accommodating unit 20, that is, the heat generating component 40 can be positioned at the lower surface of the printed circuit board to be disposed adjacently to the heat radiating unit 70.

Also, if the heat generating component 40 is disposed at a surface facing opposite to the direction of the second accommodating unit 20, that is, the upper surface of the printed circuit board, a through hole (not shown) may be formed through the printed circuit board so that the heat generated from the heat generating component 40 can be transmitted. Also, although not illustrated, the heat radiating unit 70 includes a flexible material allowing thermal conduction to transmit the heat from the heat generating component 40 to the cooling fan 70a. The through hole and the flexible material can transmit the heat to the cooling fan 70a if there is no heat transmitting unit 80.

As described above, the present general inventive concept provides an information processing apparatus to reduce the distance between a cooling fan and a heat generating component, thereby increasing a cooling efficiency.

Also, the present general inventive concept provides an information processing apparatus to dispose a cooling fan at a bottom surface of a printed circuit board to obtain a space for the printed circuit board, thereby improving portability and enabling miniaturization.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile computing apparatus, comprising:
a main body casing;
a display pivotably coupled to the main body casing;
a plurality of ports located at an outer side of the main body casing to electrically communicate with an external device;
a heat generating component accommodated in the main body casing;
a cooling fan located in the main body casing to discharge heat generated by the heat generating component to an outside of the main body casing; and
a heat discharge portion located at the outer side of the main body casing to discharge heated air moved by the cooling fan to outside the main body casing,
wherein the main body casing includes an upper accommodating portion and a lower accommodating portion located below the upper accommodating portion,
the lower accommodating portion includes at least an inwardly curved outer side that curves inwardly from the upper accommodating portion, and
the heat discharge portion is provided at the inwardly curved outer side of the lower accommodating portion such that at least a part of the heat discharge portion is located below at least one of the plurality of ports provided at the upper accommodating portion.

2. The mobile computing apparatus according to claim 1, wherein the heat generating component is mounted to a lower surface of a printed circuit board located in the upper accommodating portion of the main body casing, and
the cooling fan is situated in the lower accommodating portion so as to draw external air into an interior of the main body casing via an intake hole provided at least on the bottom surface of the lower accommodating portion and move the air across the heat generating component.

3. The mobile computing apparatus according to claim 2, wherein the lower accommodating unit comprises an intake hole separate from the heat discharge portion to enable external air to flow into an inside of the lower accommodating unit.

4. The mobile computing apparatus according to claim 1, wherein the heat generating component is mounted to a printed circuit board located in the upper accommodating unit, and
the mobile computing apparatus comprises a heat transmitting unit which leads the heat generated from the mounted heat generating component to the cooling fan.

5. The mobile computing apparatus according to claim 4, wherein the heat generating component is mounted to a lower surface of the printed circuit board.

6. The mobile computing apparatus according to claim 4, wherein the heat generating component is mounted to an upper surface of the printed circuit board, and
the heat transmitting unit comprises a through hole formed through the printed circuit board to transmit heat from the heat generating component.

7. The mobile computing apparatus according to claim 4, wherein the heat transmitting unit comprises a heat pipe which extends from the heat generating component to the cooling fan.

8. The mobile computing apparatus according to claim 4, wherein the cooling fan further comprises:
a supporting member which supports the cooling fan against the printed circuit board so that the cooling fan can be distanced from a surface of the printed circuit board.

9. The mobile computing apparatus according to claim 4, wherein the heat generating component is positioned at a central portion of the printed circuit board.

10. A mobile computing apparatus, comprising:
a main body casing including:
an upper accommodating portion having at least one heat generating component accommodated therein and a port unit formed at an outer side thereof to electrically communicate with an external device, and
a lower accommodating portion extending downward from and having a smaller area than the upper accommodating portion, the lower accommodating portion including a cooling fan which is accommodated therein and discharges heat of the heat generating component to an outside of the main body casing; and
a display pivotably coupled to the main body casing,
wherein the main body casing includes a heat discharge hole located at the outer side of the casing to discharge heated air moved by the cooling fan to outside the main body casing,
the lower accommodating portion includes an inwardly curved outer side that curves inwardly from the upper accommodating portion such that a bottom surface of the lower accommodating portion covers a smaller horizontal area than the upper accommodating portion, and
the heat discharge hole is provided at the inwardly curved outer side of the lower accommodating portion such that a portion of the heat discharge hole is located below the port provided at the upper accommodating portion.

11. The mobile computing apparatus according to claim 10, wherein the lower accommodating unit is inwardly stepped with respect to the first accommodating unit.

12. The mobile computing apparatus according to claim 11, wherein the lower accommodating unit further includes:
an intake hole to intake external air and a discharge hole to discharge air including air from the cooling fan.

13. The mobile computing apparatus according to claim 12, further comprising:
a heat transmitting unit to transmit heat generated from the at least one heat generating component to the cooling fan.

14. The mobile computing apparatus according to claim 10, wherein the heat generating component is mounted to a lower surface of a printed circuit board located in the upper accommodating portion of the casing, and
the cooling fan is situated in the lower accommodating portion so as to draw external air into an interior of the main body casing via an intake hole provided at least on the bottom surface of the lower accommodating portion and move the air across the heat generating component.

15. A mobile computing apparatus, comprising:
a main body casing including:
an upper accommodating portion having a data port in one side thereof and a heat generating unit on an inside thereof; and
a lower accommodating portion protruding from the upper accommodating portion, the lower accommodating portion including a cooling fan to receive heat from the heat generating unit and to expel the heat from the heat dissipation portion; and
a display pivotably coupled to the main body casing,
wherein the main body casing includes a heat discharge hole located at the outer side of the casing to discharge heated air moved by the cooling fan to outside the main body casing,
the lower accommodating portion includes an inwardly curved outer side that curves inwardly from the upper accommodating portion such that a bottom surface of the lower accommodating portion covers a smaller horizontal area than the upper accommodating portion, and
the heat discharge hole is provided at the inwardly curved outer side of the lower accommodating portion such that a portion of the heat discharge hole is located below the port provided at the upper accommodating portion.

16. The mobile computing apparatus according to claim 15, wherein at least one side edge of the lower accommodation portion is offset inwardly from a corresponding side edge of the main portion.

17. The mobile computing apparatus according to claim 16, wherein the lower accommodating portion includes a vent in the side edge portion that is offset inwardly from the corresponding side edge of the upper accommodating portion.

* * * * *